United States Patent [19]

Beavers et al.

[11] Patent Number: 4,665,153

[45] Date of Patent: May 12, 1987

[54] COPOLYESTERETHER BONDING COMPOSITIONS AND SHAPED ARTICLES UTILIZING THE BONDING COMPOSITIONS

[75] Inventors: Randy S. Beavers; Finley E. McFarlane; Harry R. Musser, all of Kingsport, Tenn.

[73] Assignee: Eastman Kodak Company, Rochester, N.Y.

[21] Appl. No.: 864,997

[22] Filed: May 20, 1986

[51] Int. Cl.⁴ ............................................. C08G 63/18
[52] U.S. Cl. .................................. 528/173; 528/295; 528/300; 528/302
[58] Field of Search ............... 528/295, 300, 302, 173

[56] References Cited

U.S. PATENT DOCUMENTS

| | | | |
|---|---|---|---|
| 4,327,206 | 4/1982 | Jackson et al. | 528/179 |
| 4,352,924 | 10/1982 | Wooten et al. | 528/302 |
| 4,585,687 | 4/1986 | Posey et al. | 528/295 |
| 4,604,446 | 8/1986 | Sand et al. | 528/173 |

Primary Examiner—Lucille M. Phynes
Attorney, Agent, or Firm—John F. Stevens; William P. Heath, Jr.

[57] ABSTRACT

Disclosed are polyesterether bonding compositions comprising repeating units from trans-1,4-cyclohexanedicarboxylic acid, a difunctional sulfomonomer, a polyetherglycol, and 1,4-cyclohexanedimethanol.

14 Claims, No Drawings

COPOLYESTERETHER BONDING COMPOSITIONS AND SHAPED ARTICLES UTILIZING THE BONDING COMPOSITIONS

DESCRIPTION

1. Technical Field

This invention relates to polyesterether bonding compositions and shaped articles comprising polyester or polycarbonate inner and outer layers, poly(vinyl alcohol) or copolymers thereof as a barrier layer between the inner and outer layers, and tie layers of the bonding compositions. The articles are characterized by greatly improved gas barrier properties.

2. Background Art

U.S. Pat. No. 4,261,473 discloses multilayer structures useful as packaging materials. Particularly, this patent discloses molded containers having a barrier layer interposed between layers of a thermoplastic polyester resin. The barrier layer typically is a blend of polymers such as ethylenevinyl alcohol copolymer and polyethylene terephthalate or a polyamide polymer. These containers may be fabricated from a coextruded pipe of five layers comprising for example a resin outer layer, an adhesive layer, a barrier layer, an adhesive layer and a resin inner layer.

U.S. Pat. No. 3,595,740 discloses laminar film structures comprising a thermally formable base layer, a barrier layer of a hydrolyzed copolymer from ethylene-vinyl acetate and a heat sealable layer. Also disclosed is the use of certain adhesive compositions to tie the layers together (see Column 3, line 55+).

U.S. Pat. No. 3,849,514 discloses block polyester-polyamide copolymers which are reported to be useful as an adhesive among many other uses. The block polyester-polyamide copolymers encompass such polymers made from any aliphatic, alicyclic, and aromatic difunctional diamine; any aliphatic, alicyclic, and aromatic dicarboxylic acid or esters thereof; and aliphatic, alicyclic, and aromatic diols.

U.S. Pat. Nos. 4,481,238; 4,482,587; and 4,482,588 relate to bonding compositions comprising poly(esteramides). U.S. Pat. No. 4,459,400 relates to piperazine poly(ester-amide) bonding compositions.

U.S. patent application Ser. No. 686,508 filed Dec. 26, 1984 which relates to copolyesterether bonding compositions, is assigned to the same assignee as the present application.

DISCLOSURE OF THE INVENTION

This invention includes bonding compositions for bonding polyesters, copolyesters, or polycarbonates to poly(vinyl alcohol), or copolymers thereof.

According to the present invention, there is provided a copolyesterether comprising the reaction product of:

(a) about 90–97.5 mole % 1,4-cyclohexanedicarboxylic acid or ester thereof (DMCD) which has a trans isomer content of about 70–80%, (b) about 2.5–10 mole % of at least one difunctional sulfomonomer containing at least one metal sulfonate group attached to an aromatic nucleus wherein the functional groups are carboxyl, (c) about 5–12 mole % of a polyetherglycol having a molecular weight of about 500–2000 and an oxygen to carbon ratio of 1:2 to 1:4, and (d) about 95–70 mole %, preferably about 95–88 mole %, 1,4-cyclohexanedimethanol (CHDM).

Optionally, the copolyesterether may contain repeating units from up to about 25 mole % of a glycol having 2–6 carbon atoms, wherein the acid and glycol components total 100 mole % each.

The polymerization is carried out using conventional techniques and is conveniently catalyzed with an ester-exchange catalyst such as titanium. The polymer is conveniently stabilized with Irganox 1010 antioxidant (tetrakis[methylene(3,5-di-tert-butyl-4-hydroxyhydrocinnamate)methane]).

The sulfomonomer moiety is required for elasticity and adherence to the ethylene vinyl alcohol. A crystallizing glycol component is required to prevent the polymer from being tacky at the temperatures at which it is handled and a modifying glycol component is needed to reduce the level of crystallinity for ease in processing the polymer.

The total mole % of the acid component is 100. Thus, (a) and any carboxyl functional groups from (b) should total 100 mole %. Likewise, the total mole % of the glycol component is 100. Thus (c), (d), and any hydroxy or amino groups from (b) and any optional glycol should total 100 mole %.

The polyesterether composition according to this invention contains repeating units from 1,4-cyclohexanedicarboxylic acid. This term is intended to include ester-forming derivatives thereof, such as dimethy-1,4-cyclohexanedicarboxylate, which is the preferred material and is commercially available.

The difunctional sulfomonomers are described completely in U.S. Pat. No. 3,779,993, the disclosure of which is incorporated herein by reference.

The difunctional sulfomonomer component of the copolyesterether may advantageously be a dicarboxylic acid or an ester thereof containing a metal sulfonate group or a glycol containing a metal sulfonate group. The metal ion of the sulfonate salt may be Na+, Li+, K+ and the like.

Advantageous difunctional sulfomonomer components are those wherein the sulfonate salt group is attached to an aromatic acid nucleus such as a benzene, naphthalane, diphenyl, oxydiphenyl, sulfonyldiphenyl, or methylenediphenyl nucleus. Preferred results are obtained through the use of sulfophthalic acid, sulfoterephthalic acid, sulfoiosphthalic acid and their esters. Especially preferred is 5-sodiosulfoisophthalate.

Also especially preferred is 5-sodiosulfoisophthalate at a level of about 3–8 mole % and dimethyl-1,4-cyclohexanedicarboxylate at a level of about 97–92 mole %.

When the sulfonate-containing difunctional monomer is an acid or its ester, the polyester or polyesteramide should contain at least 2.5 mole percent of said monomer based on total acid content. Total acid content is calculated as the sum of (1) moles of component (a) and (2) moles of component (b) which are dicarboxylic acids.

The preferred polyetherglycols include polyethylene glycol, polypropylene glycol, polyethylene/polypropylene glycol, and polytetramethylene ether glycol.

To obtain the modified polymers of this invention, the sulfonate-containing difunctional monomer modifier may be added directly to the reaction mixture from which the polymer is made. Thus, these monomer modifiers can be used as a component in the original polymer reaction mixture. Other various processes which may be employed in preparing the novel polymers of this invention are well known in the art and are illustrated in such patents as U.S. Pat. Nos. 2,465,319; 3,018,272; 2,901,466; 3,075,952; 3,033,822; 3,033,826 and 3,033,827. These patents illustrate interchange reactions as well as polymerization or build-up processes.

This invention includes shaped articles comprising a polyester or polycarbonate polymer layer and a poly(vinyl alcohol) layer, the layers being bonded together with bonding compositions of this invention. It is preferred that the poly(vinyl alcohol) layer be an ethylene-vinyl alcohol copolymer having an ethylene content of 30 to 50 mol percent. The shaped article may be an oriented film or an oriented bottle.

The invention includes oriented beverage bottles comprising an outer layer of poly(ethylene terephthalate), a barrier layer of an ethylene-vinyl alcohol copolymer, and an inner layer of poly(ethylene terephthalate, the respective layers being bonded together by tie layers of the bonding composition of this invention disposed between the outer layer and the barrier layer and the inner layer and the barrier layer.

The invention further includes a coextruded tubular structure comprising an outer layer of poly(ethylene terephthalate), a barrier layer of ethylenevinyl alcohol copolymer and an inner layer of poly(ethylene terephthalate), the layers being bonded together by a tie layer of the composition of this invention disposed between the outer layer and the barrier layer and the inner layer and the barrier layer. The tubular structure may be formed into a parison or preform for blowing beverage bottles.

The polyester polymers suitable for use in this invention include poly(ethylene terephthalate) and modifications thereof with aliphatic glycols containing from 3 to 12 carbon atoms. These may be either linear or branched and may contain ring structures. Examples of especially useful modifying glycols are 1,4-butanediol, 1,6-hexanediol, 1,4-cyclohexanedimethanol, and neopentyl glycol. The poly(ethylene terephthalate) may also be modified with diacids. Aliphatic and aromatic diacids may be used. Especially useful as a modifying diacid is isophthalic acid.

Generally, either the diol or diacid modifier may be used at up to about 50 mole % but the most useful materials are those where orientation can be developed by deforming heated articles, thereby restricting the useful modification level to about 15 mole % and below.

Other polyesters or copolyesters may be used in this invention besides poly(ethylene terephthalate). A particularly useful group of copolyesters is the one based on 1,4-cyclohexanedicarboxylic acid, 1,4-cyclohexanedimethanol, and poly(tetramethylene oxide) glycol as described in U.S. Pat. No. 4,349,469.

Other useful polyesters are poly(1,4-cyclohexylenedimethylene terephthalate) and copolymers thereof with aliphatic diols of 2 to 12 carbon atoms or aliphatic or aromatic diacids as described above.

Useful polycarbonates include those prepared from bisphenol A and phosgene.

The vinyl alcohol polymers useful in the articles of this invention include those wherein the olefin content of the copolymer is between about 7 and about 50% mole percent and the residual ester content of the vinyl alcohol portion is below 3.0%. It is preferred that the differential thermal analysis curve for the copolymer be a single narrow endotherm having a melting range of less than 30° C. Also, the olefin content of the copolymer should be maintained within a narrow distribution range and significant amounts of homopolymer segments of either olefin or vinyl alcohol should be avoided.

The olefin distribution range and the presence of homopolymers is most conveniently measured using differential thermal analysis (DTA) techniques. The differential thermal analysis (DTA) is carried out according to the procedure set forth by D. A. Vassalo and J. C. Harden in Analytical Chemistry, Volume 34, January, 1962, pages 132-135, using a Du Pont 900 Differential Thermal Analyzer programmed at a 30° C./minute rate. A DTA curve wherein the curve is characterized by a single narrow melting endotherm having a range of less than 30° C. indicates a narrow olefin distribution in the copolymer.

An example of the preparation of a preferred ethylene-vinyl alcohol copolymer is as follows.

Vinyl acetate monomer (1250 grams) is charged to a one-gallon stainless steel autoclave equipped with an internal cooling coil and agitation means. The vessel and contents are cooled to 15° C. by circulating cold water in the cooling coil. Solid isopropyl percarbonate (1.125 grams) is added to 1250 grams of vinyl acetate previously cooled to $-40°$ C. The percarbonate dissolves readily with gentle agitation and the solution is then poured into the autoclave. The autoclave is pressurized while maintaining agitation, with 100 psig (7.03 kg/cm$^2$ gage) ethylene and then vented to zero psig (atmospheric pressure). The autoclave is purged twice again in the same manner in order to remove any oxygen from the autoclave and its contents. Then the reaction temperature is increased to 45° C. by means of an external electrical heating mantle; the pressure is 100 psig (7.03 kg/cm$^2$) before heating and additional ethylene is added to bring the pressure to 450 psig (31.6 kg/cm$^2$) simultaneously with the temperature rise to 45° C. The reaction temperature is controlled between 45° C. and 46° C. The autoclave is vented several times during the run in order to maintain a constant pressure of 450 psig (31.6 kg/cm$^2$). The cooling of the monomer and the simultaneous increase in temperature and pressure is carried out to avoid any premature polymerization that would result in any homopolymer segments. After four hours reaction time a monomer conversion of 35.8% is achieved and the autoclave contents are cooled rapidly to 20° C. without venting of pressure and the contents are dumped into two volumes of methanol containing 0.1% by weight of inhibited styrene monomer which process acts to rapidly quench the polymerization process and avoid residual polymerization that may produce segments of homopolymer. The ethylene-vinyl acetate resin is recovered within 24 hours by disintegration of the varnish into several volumes of hexane. The resin, which is dried overnight at 75° C., has an ethylene content of 32 mol percent and a viscosity number of 0.763 dl/g in toluene (0.25 g/100 ml) at 25° C.

The foregoing ethylene-vinyl acetate polymer is hydrolyzed to form ethylene-vinyl alcohol polymer having less than 3% residual vinyl acetate groups. The hydrolysis is carried out using a 4% by weight solution of sodium hydroxide in methanol according to the procedures well known to those skilled in the art.

The hydrolyzed ethylene-vinyl alcohol resin has a viscosity number of 1.414 dl/g in dimethyl sulfoxide (0.25 g/100 ml) at 25° C.

A differential thermal analysis (DTA) curve of the hydrolyzed polymer shows a single narrow melting endotherm (DTA) having a range of 15° C. with a minimum at 177° C. The narrow endotherm indicates that the ethylene-vinyl alcohol polymer has a narrow ethylene distribution, i.e., the individual chain segments that make up the polymer mass have a narrow ethylene distribution around a mean which is the total amount of ethylene in the copolymer. The single melting endotherm indicates that the polymer does not have significant amounts of homopolymer in the resin.

Suitable vinyl esters which can be copolymerized with the olefin comonomers and subsequently hydrolyzed to form the olefin-vinyl alcohol copolymers of this invention include vinyl ester monomers of the general formula

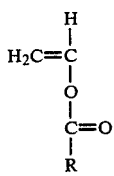

wherein R is selected from the group comprising hydrogen, alkyl groups of from 1 to 10 carbon atoms, aryl groups of from 6 to 10 carbon atoms including the carbon atoms in ring substituted alkyl substituents, e.g., vinyl formate, vinyl acetate, vinyl propionate, vinyl butyrate, vinyl benzoate, and the like. Preferably, the vinyl ester is vinyl acetate.

The preferred olefin-vinyl alcohol materials are ethylene-vinyl alcohol copolymers and wherein the olefin content is from 7 to 50 mol percent based on the weight of the copolymer. The residual ester content of the copolymer should be less than 3% and preferably less than 2% by weight. Most preferably the residual ester content is less than 1% by weight. The preferred ethylene-vinyl alcohol copolymer resins will contain less than 2% homopolymers. Especially preferred are homopolymers with less than 1% homopolymer. An example of a preferred copolymer is EVAL F (trademark) resin marketed by Kuraray Company.

In the preparation of the preferred copolymers, the ethylene and the vinyl ester are polymerized in the presence of a free radical initiator to a conversion of from 20 to 70% at temperatures between −50° C. and 100° C.

The choice of initiator system is based on the necessity for minimizing chain transfer reactions such as hydrogen abstraction; solubility in the polymerization medium; and a half-life for radical generation generally between 0.1 to 100 hours and preferably between 0.5 and 5 hours. These initiators considerations are well known to those skilled in the art and need no further discussion here.

Examples of suitable initiators that meet the above requirements include the alkyl boranes such as triethyl borane, tripropyl borane, tributyl borane, etc. Tributyl borane is especially preferred for polymerization at subambient temperatures. Also included are azobis compounds such as azobisisobutyronitrile; organic and inorganic peroxy and hydroperoxy compounds such as salts of persulfuric acid, benzoyl peroxide, isopropyl percarbonate, hydrogen peroxide, etc., the so-called redox combinations suc as t-butylhydroperoxide/-sodium formaldehyde sulfoxalate, etc.

Organic solvent, which may also be included in the polymerization charge, has the advantage of tending to increase the ethylene content of the polymer for a given polymerization pressure. Solvents are also useful for limiting the molecular weight achieved during polymerization. For this reason solvents are not used at all when it is desired to maximize molecular weight. For example, only 1% of methanol on the charge causes a significant reduction in polymer molecular weight. Examples of suitable solvents include alcohols, ketones, esters, aromatic hydrocarbons, etc.

In order to obtain a copolymer suitable for use in this invention, wherein the copolymer has a narrow range of olefin distribution and has no significant amounts of homopolymer, certain critical steps in the polymerization process must be observed. An outline of these steps is set forth below.

1. Monomer conversion should be held to amounts in the range of from 1 to 70% conversion with 5 to 45% being the preferred range.
2. Prior to and during the polymerization reaction, the reactor system and reactants, solvents, should be purged free of oxygen.
3. Conditions which would permit polymerization prior to the stabilization reaction temperature and olefin pressure or during the recovery step should be avoided.
4. A constant temperature and constant olefin pressure should be maintained during the polymerization reaction. In this regard the temperature should be maintained within ±5° C. and the olefin pressure with ±5% of the pressure specified for any given system.

Such olefin-vinyl alcohol polymers and their preparation are known in the art. See, for example, U.S. Pat. No. 3,585,177, the specification of which is incorporated herein by reference.

Although the poly(esterethers) of this invention can be used to advantage for any coextrusion application, the optimum advantage of the poly(esterethers) of this invention is for use in coextrusions which will be followed by some orientation process being performed at a temperature and conditions chosen to result in orienting the polyester portion of the coextruded structure.

The oriented laminar films of this invention may conveniently be prepared by the methods disclosed in U.S. Pat. Nos. 3,479,425 and 3,557,265, the specifications of which are incorporated herein by reference. U.S. Pat. No. 3,479,425 discloses a method of extruding laminar film wherein a composite stream consisting of coaxial streams of plastic is provided, passed to a sheeting die wherein the coaxial stream is deformed to provide a layered sheet. U.S. Pat. No. 3,557,265 discloses a method whereby plastic film or sheet having a plurality of layers is formed by deforming a flowing stream having layers of diverse thermoplastic material wherein the cross-sectional configuration of the plurality of flowing stream is altered by reducing the dimension of the stream in a direction generally perpendicular to the interfaces between the individual streams and by increasing the dimension of the stream in a direction generally parallel to the interface to provide a sheet or film having a laminar structure.

The extruded pipe of this invention is made in a conventional manner by coextruding through a series of plate dies to sequentially overcoat the appropriate materials in such a manner that the resulting annular structure is arranged in five layers. Different relative extruder screw speeds and take-off rates permit a variety of different tubing products to be later made into preform and later to oriented bottles.

In making the five layer pipe of this invention with an A-B-C-B-A arrangement (A=polyester or polycarbonate, B=tie layer and C=barrier layer), we split the flow of a primary 2½ inch extruder such that it could supply both the inner and outer layers (A). By use of conventional valving arrangements in the bypass line, relative control of the flow between the inner and outer layers may be obtained, thereby the thickness of the layers may be controlled. To extrude the tie layer, a 1⅛ inch Killion extruder was provided with a valved split manifold to allow deposit of the tie layer (B) on either side of the barrier layer (C). The barrier layer was extruded via a ¾ inch Killion extruder. A stacked plate die arrangement is used to form the respective layers. For example a toroidoldistribution manifold such as that disclosed in Chapter 15 of *Polymer Blends,* Volume II and entitled "Co-Extruded Muti-Layer Polymer Films and Sheets" illustrated on page 133, FIG. 34 operates using the same principal as our stacked plate die arrangement, Pipe coextrusion is an established art but usually is done with only three layers and they do not differ appreciably in relative thickness.

To produce a five-layer pipe having a wall thickness 0.150 inches the layers may be arranged as follows:

|  | Thickness, Inches | Percent of Total |
| --- | --- | --- |
| Outer Layer | 0.072 | 48.00 |
| Tie Layer | 0.002 | 1.33 |
| Barrier Layer | 0.002 | 1.33 |
| Tie Layer | 0.002 | 1.33 |
| Inner Layer | 0.072 | 48.00 |
| Total Thickness | 0.150 | 100.00 |

The combined tie layers and barrier layers compose, in this instance, only four percent of the total structure. The five-layer pipe emerges from the die, is drawn down to approximately one inch outer diameter and then enters a conventional vacuum chamber for sizing and cooling. A 0.050 inch thick, 1⅛ inch long brass sizing sleeve equipped with a water spray ring provides the initial sizing and cooling. The structure continues, while immersed, through the vacuum tank for additional cooling. Further downstream water cooling tanks are used to reduce the pipe to near ambient temperature before pulloff and cutoff.

By varying flow of polymer to the inner and outer layers (AA), the tie layers and barrier layer (BCB) combination can be positioned to place it near the outer diameter or nearer the inner diameter of the pipe as desired. To achieve balanced cooling of pipe one may wish to move the BCB layer combination toward the inner diameter to prevent differential shrinkage and thus prevent stresses and thereby significant separating forces in the tie layers.

The pipe is cut off to predetermined lengths and the lengths are formed into preforms or parisons to be blown into bottles. The pipe may be formed into parisons using the method disclosed in U.K. Patent Specification No. 1,513,067 and known as the Corpoplast system. Generally, the parisons are produced by a combination of steps including gripping a cold parison of tubular shape with open ends from outside intermediate to its ends, heating the ends of the parison to deformation temperature, transferring the heated parison to a die station, gripping the parison externally intermediate to its ends in the die station, deforming first one heated end to form a closed end, enclosing the other heated end in a mold defining a cavity including threads to form neck portion on the parison, moving a core into the outer open end to radially expand and to axially displace the end, and finally admitting a pressurized medium into the interior of the parison to complete the forming of the parison neck portion. The parisons or preforms may also be made by the method disclosed in U.K. Patent Application No. GB 2052367A.

A preferred method of blowing the bottles of this invention involves the use of a RHB-VII three-lane, two-stage reheat blowing machine designed to produce one-half liter bottles. This machine is manufactured by Cincinnati Milacron, Plastics Machinery Division of Batavia, Ohio. The machine comprises a parison or preform carrier loading unit, a preform carrier and conveyer system, a three-lane heating system, doubleacting toggle clamp unit, bottle ejection system and a programmable control system.

In this system preforms are conveyed from a floor level hopper to an unscrambler unit at the top of the machine. Here preforms are unscrambled and directed to three individual lane-loaders each capable of loading three preforms at a time. Then elevators reach up, take three preforms each (in neck-down position), and place them in carriers (once preforms are in place on the carriers they remain there until ejected as finished bottles). Carriers then advance to a quartz heating unit, the preforms pass (neck up) through the heating unit, rotating as they travel, to assure uniform heat distribution.

At the end of the heat zone, rotation stops and the preforms pass into an equilibration zone where heat in the preform walls is allowed to stabilize at the precise temperature for the blowing process. From this zone, the preforms advance to the blow station where a 75-ton toggle clamp closes the blow molds around the preforms. Stuffer noses advance to form an air seal on the top of the carrier. At the same time the center rods are inserted into the preforms and air is introduced around the rods, blowing the preforms radially and axially. When the processing is completed, the center rods and stuffer noses retract and the blown bottles advance to the eject station. Here the bottles are released from the carriers, dropping through guide tubes into take-away equipment.

This invention can be further illustrated by the following examples of preferred embodiments thereof, although it will be understood that these examples are included merely for purposes of illustration and are not intended to limit the scope of the invention unless otherwise specificaly indicated.

All T-peel values are run in accordance with ASTM D-1876. The cis/trans isomer content of the DMCD is determined by conventional techniques of hydrolyzing the polymer and characterization of the isomer using gas chromatography.

The samples are autoclaved for 1 hour at 121° C. and 15 psi pressure to simulate sterilization conditions, under which articles of this invention may be subjected.

All inherent viscosities are determined at 25° C. in 60/40 (wt/wt) phenol/tetrachloroethane (PTCE) at a concentration of 0.5 g/100 mL, and are given in units of dl/g.

EXAMPLE 1

This example illustrates the synthesis of a polyesterether suitable for application as a tie layer. Into a 500 mL flask equipped with a stirrer, nitrogen inlet and volatiles outlet are weighed 16.8 g of 5-sodiosulfoisophthalic acid (0.010 mole), 76.0 g of dimethyl-1,4-cyclohexane dicarboxylate (0.38 mole), 53.5 g (includes 2% excess) of 1,4-cyclohexanedimethanol (0.364 mole), 35.6 g of poly(tetramethylene oxide) glycol (0.0356 mole of an average molecular weight of 1000), and 0.3 g of Irganox 1010 antioxidant. The ester exchange catalyst is 1.48 mL of a solution of titanium tetraisopropoxide in 1-butanol which is 0.98 wt./vol. % in titanium. The mixture is reacted with stirring under nitrogen at 200° C. for 30 minutes and 220° C. for 60 minutes. After increasing the temperature to 275° C., a vacuum is applied and material is polycondensed under less than 0.3 torr pressure for 20-40 minutes before releasing the vacuum with nitrogen.

The final IV of the copolyester is 0.830 and has a crystalline melting point of 103° C. and a DMCD cis/trans ratio of 21.2/78.8%. The polyesterether is coextruded into a 5-layer structure (ABCBA wherein A is polycarbonate). T-peel analysis gives the following results:

| Before autoclaving | 8.2 lb/in |
|---|---|
| After Autoclaving (air dried*) | 7.3 lb/in. |
| After Autoclaving (oven dried**) | 7.9 lb/in. |

*Dried at ambient lab conditions overnight
**Dried in a vacuum oven at 60° C. overnight

EXAMPLE 2

This example illustrates the synthesis of a polyesterether suitable for application as a tie layer. Into a 500 mL flask equipped with a stirrer, nitrogen inlet and volatiles outlet are weighed 21.1 g of 5-sodiosulfoisophthalic acid (0.03 mole), 74.0 g of dimethyl-1,4-cyclohexane dicarboxylate (0.37 mole), 53.5 g (includes 2% excess) of 1,4-cyclohexanedimethanol (0.364 mole), 35.6 g of poly(tetramethylene oxide) glycol (0.0356 mole of an average molecular weight of 1000), and 0.3 g of Irganox 1010 antioxidant. The ester exchange catalyst is 1.48 mL of a solution of titanium tetraisopropoxide in 1-butanol which was 0.98 wt./vol. % in titanium. The mixture is reacted with stirring under nitrogen at 200° C. for 30 minutes and 220° C. for 60 minutes. After increasing the temperature to 275° C., a vacuum is applied and the material is polycondensed under less than 0.3 torr pressure for 20-40 minutes before releasing the vacuum with nitrogen.

The final IV of the copolyester is 0.758 and has a crystalline melting point of 82.3° C. and a DMCD cis/trans ratio of 26.9/73.1%. The polyesterether is coextruded into a 5-layer structure (ABCBA wherein A is polycarbonate). T-peel analysis gives the following results:

| Before Autoclaving | 8.4 lb/in. |
|---|---|
| After Autoclaving (air dried) | 7.0 lb/in. |
| After Autoclaving (oven dried) | 8.0 lb/in. |

EXAMPLE 3

Polyester is prepared in a 50-pound batch reactor as in Example 2. The copolyesterether has a crystalline melting point of 83.1° C. and a DMCD cis/trans ratio of 25.1/74.9%. The material is coextruded into a 5-layer structure (ABCBA wherein A is polyester). The 20-mil film is biaxially oriented (4×4) on a tentor frame process and heatset 2 minutes at 180° C. (forced-air oven). T-peel analysis gives the following results:

| Before Autoclaving | 8.5 lb/in. |
|---|---|
| After Autoclaving (air dried) | 6.6 lb/in. |
| After Autoclaving (oven dried) | 8.1 lb/in. |

EXAMPLE 4

Into a 500-mL flask equipped with a stirrer, nitrogen inlet and volatiles outlet are weighed 16.8 g of 5-sodiosulfoisophthalic acid (0.010 mole), 76.0 g of dimethyl-1,4-cyclohexane dicarboxylate (0.38 mole), 53.5 g (includes 2% excess) of 1,4-cyclohexanedimethanol (0.364 mole), 35.6 g of poly(tetramethylene oxide) glycol (0.0356 mole of an average molecular weight of 1000), 0.3 g of Irganox 1010 antioxidant and 0.16 g of NaOAc. The ester exchange catalyst is 1.48 mL of a solution of titanium tetraisopropoxide in 1-butanol which is 0.98 wt./vol. % in titanium. The mixture is reacted with stirring under nitrogen at 200° C. for 30 minutes and 220° C. for 60 minutes. After increasing the temperature to 275° C., a vacuum is applied and material is polycondensed under less than 0.3 torr pressure for 20-40 minutes before releasing the vacuum with nitrogen.

The final IV of the copolyesterether is 0.890 and has a crystalline melting point of 178° C. and a DMCD cis/trans ratio of 6.2/93.8%. The polyesterether is coextruded into a 5-layer structure (ABCBA wherein A is polycarbonate). T-peel analysis gives the following results:

| Before Autoclaving | 2.6 lb/in. |
|---|---|
| After Autoclaving (air dried) | 0.3 lb/in. |
| After Autoclaving (oven dried) | 0.5 lb/in. |

This example illustrates that material prepared with sodium acetate (buffer), prohibits isomerization of the DMCD moiety, which gives a higher crystalline polyesterether resulting in reduced adhesion before and after autoclaving.

EXAMPLE 5

Into a 500-mL flask equipped with a stirrer, nitrogen inlet and volatiles outlet are weighed 25.1 g of 5-sodiosulfoisophthalic acid (0.03 mole), 74.0 g of dimethyl-1,4-cyclohexane dicarboxylate (0.37 mole), 53.5 g (includes 2% excess) of 1,4-cyclohexanedimethanol (0.364 mole), 35.6 g of poly(tetramethyleneoxide) glycol (0.0356 mole of an average molecular weight of 1000), 0.3 g of Irganox 1010 antioxidant and 0.25 g of sodium acetate. The ester exchange catalyst is 1.48 mL of a solution of titanium tetraisopropoxide in 1-butanol which is 0.98 wt./vol. % in titanium. The mixture is reacted with stirring under nitrogen at 200° C. for 30 minutes and 220° C. for 60 minutes. After increasing the temperature to 275° C., a vacuum is applied and the material is polycondensed under less than 0.3 torr pressure for 20-40 minutes before releasing the vacuum with nitrogen.

The final IV of the copolyesterether is 0.870 and has a crystalline melting point of 170° C. and a DMCD cis/trans ratio of 13.3/86.7%. The sample is coextruded into a 5-layer structure ABCBA wherein A is poly(ethylene terephthalate). The 20-mil film sample is biaxially oriented (4×4) on a tentor frame process and heatset 2 minutes at 180° C. (forced-air oven). T-peel analysis gives the following results:

| Before Autoclaving | 2.3 lb/in. |
| --- | --- |
| After Autoclaving (air dried) | 0.2 lb/in. |
| After Autoclaving (oven dried) | 0.4 lb/in. |

Like Example 4, this material is prepared with sodium acetate (buffer) which gives a polyesterether with higher crystallinity resulting in poor adhesion before and after autoclaving.

The invention has been described in detail with particular reference to preferred embodiments thereof, but it will be understood that variations and modifications can be effected within the spirit and scope of the invention.

We claim:

1. A copolyesterether comprising the reaction product of
   (a) about 90-97.5 mole % 1,4-cyclohexanedicarboxyic acid or esters thereof having a trans isomer content of about 70-80%;
   (b) about 2.5-10 mole % of at least one difunctional sulfomonomer containing at least one metal sulfonate group attached to an aromatic nucleus wherein the functional groups are carboxyl;
   (c) about 5-12 mole % of a polyetherglycol having 2-4 carbon atoms, a molecular weight of about 500-2000 and an oxygen to carbon ratio of 1:2 to 1:4; and
   (d) about 95-70 mole % 1,4-cyclohexanedimethanol.

2. A copolyesterether according to claim 1 which contains repeating units from up to about 25 mole % of a glycol having 2-6 carbon atoms, wherein the total mole % of glycol is 100%.

3. A copolyesterether according to claim 1 wherein the sulfomonomer is sulfoisophthalic acid or sulfoisophthalate.

4. A polyesterether according to claim 1 wherein the sulfomonomer is sodiosulfoisophthalate.

5. A polyestherether according to claim 1 wherein said polyetherglycol is poly(tetramethylene oxide) glycol.

6. A bonding composition comprising the polyesterether of claim 1.

7. Shaped article comprising a polyester or polycarbonate polymer layer and a poly(vinyl alcohol) layer, said layers being bonded together with the composition of claim 1.

8. Shaped article of claim 7 wherein said article is a film.

9. Oriented shaped article of claim 7 wherein said article is a bottle.

10. Oriented shaped article of claim 7 wherein said article is a beverage bottle having an outer layer comprising poly(ethylene terephthalate) or a copolymer thereof, a barrier layer comprising a copolymer of ethylene-vinyl alcohol and an inner layer comprising poly(ethylene terephthalate) or a copolymer thereof, said layers being bonded together by tie layers of the composition of claim 1 disposed between said outer layer and said barrier layer and said inner layer and said barrier layer.

11. Shaped article comprising a coextruded tubular structure having an outer layer comprising poly(ethylene terephthalate), polycarbonate or copolymers thereof, a barrier layer comprising a copolymer of ethylene-vinyl alcohol and an inner layer comprising poly(ethylene terephthalate) or copolymers thereof, said layers being bonded together by a tie layer of the composition of claim 1 disposed between said outer layer and said barrier layer and said inner layer and said barrier layer.

12. Shaped article of claim 10 wherein said article is a parison.

13. Shaped article of claim 7 wherein said polyester polymer layer is selected from poly(ethylene terephthalate, poly(ethylene terephthalate) modified with up to about 50 mol percent of aliphatic glycols containing 3-12 carbon atoms or up to about 50 mol percent of an aliphatic or aromatic diacid or combinations thereof.

14. Shaped article of claim 7 wherein said polyester polymer layer is modified up to about 15 mol percent of said glycols and acids.

* * * * *